United States Patent [19]

Esch

[11] Patent Number: 4,964,063
[45] Date of Patent: Oct. 16, 1990

[54] SYSTEM AND METHOD FOR FRAME AND UNIT-LIKE SYMBOLIC ACCESS TO KNOWLEDGE REPRESENTED BY CONCEPTUAL STRUCTURES

[75] Inventor: John W. Esch, Burnsville, Minn.

[73] Assignee: Unisys Corporation, Blue Bell, Pa.

[21] Appl. No.: 244,365

[22] Filed: Sep. 15, 1988

[51] Int. Cl.[5] ............................................ G06F 15/18
[52] U.S. Cl. .................................. 364/513; 364/274.3; 364/974; 364/200; 364/900
[58] Field of Search ................ 364/513, 200 MS File, 364/900 MS File, 488

[56] References Cited

U.S. PATENT DOCUMENTS

| | | | |
|---|---|---|---|
| 4,656,603 | 4/1987 | Dunn | 364/488 |
| 4,658,370 | 4/1987 | Erman et al. | 364/900 |
| 4,748,439 | 5/1988 | Robinson et al. | 364/900 |

Primary Examiner—Jerry Smith
Assistant Examiner—Paul Gordon
Attorney, Agent, or Firm—Glenn W. Bowen; Robert S. Bramson

[57] ABSTRACT

Conceptual structures which can be used to represent any knowledge that can be represented by frames/units. Its realization, in a software program called Unit Interface, provides a method of storing frame/unit data in conceptual structures and algorithms for accessing that data when stored in conceptual structures as if it were a frame/unit or collection of them.

5 Claims, 24 Drawing Sheets

Fig. 2  GENERAL STRUCTURE OF A UNIT/FRAME

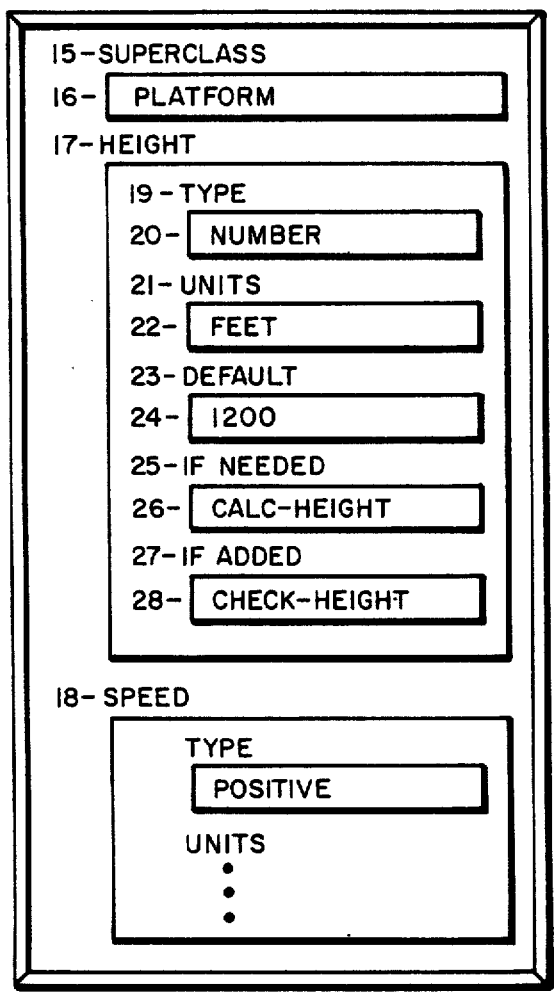
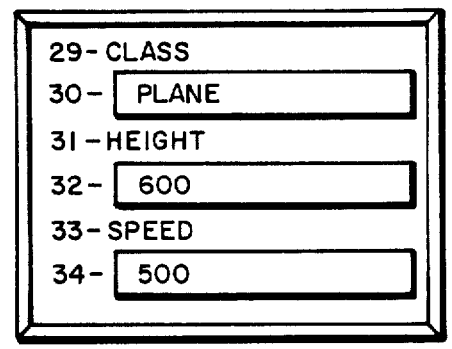
Fig. 3  FRAMES/UNITS

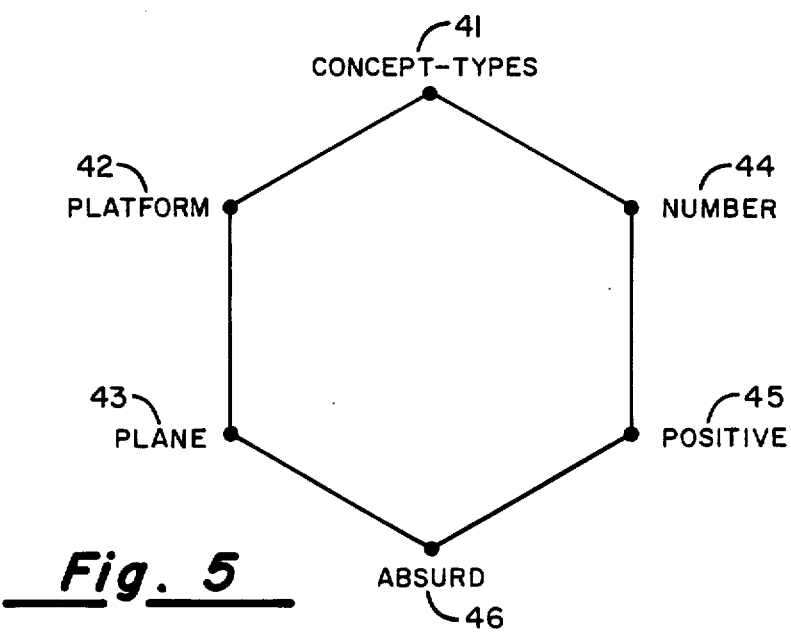
Fig. 5
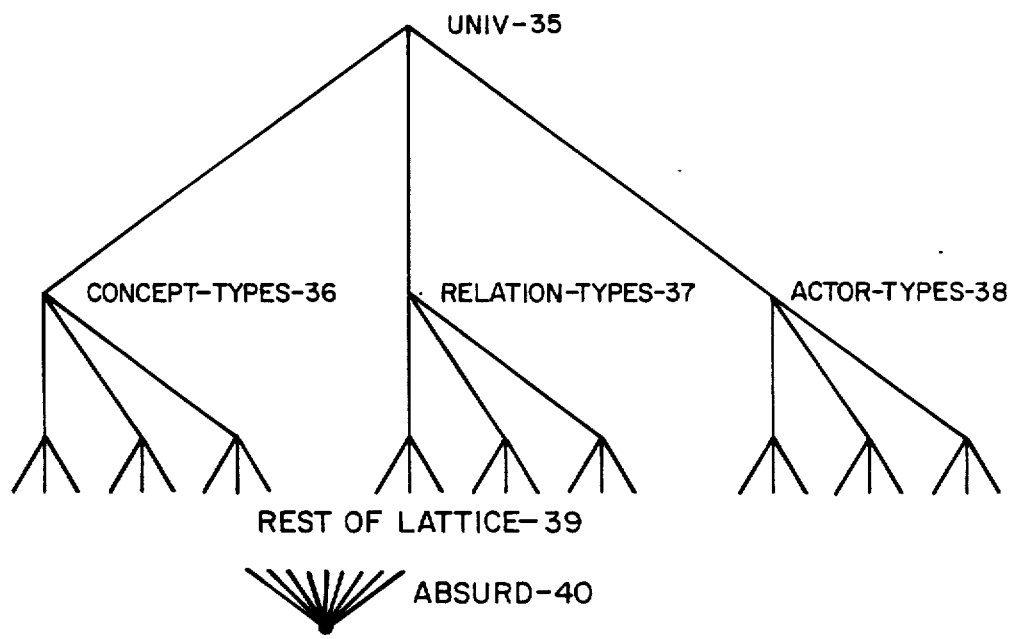
Fig. 4    TYPE LATTICE STRUCTURE

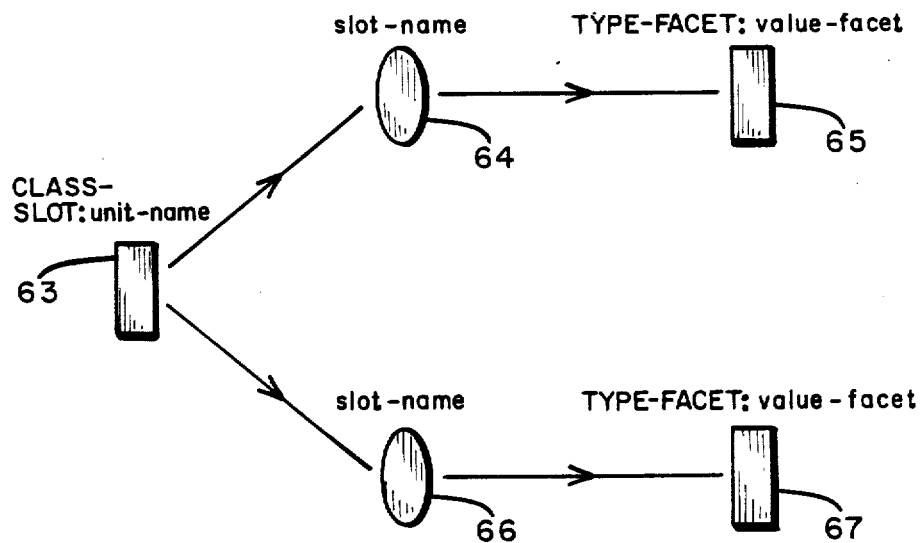
CONCEPTUAL GRAPH TEMPLATE FOR MEMBER UNITS
_Fig. 8_
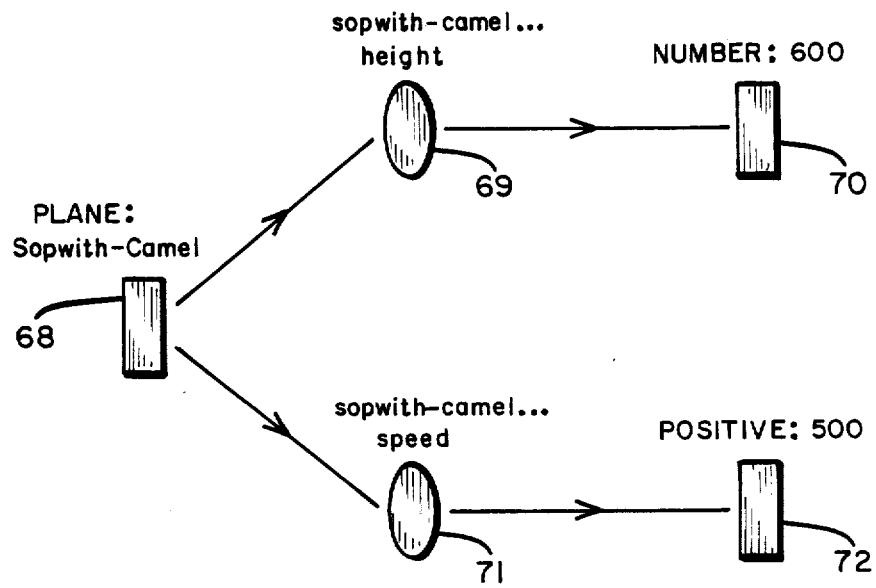
CONCEPTUAL GRAPH FOR SOPWITH-CAMEL MEMBER UNIT
_Fig. 9_

CONCEPT DEFINITION TEMPLATE FOR CLASS UNITS

CONCEPT DEFINITION FOR PLANE CLASS UNIT

RELATION DEFINITION TEMPLATE FOR FACETS AND DEAMONS

RELATION DEFINITIONS FOR EXAMPLE FACETS AND DEAMONS (GET.VALUES unit name slot.name & optional facet.name)

(UNIT.EXISTS.P unit.name)

(SLOT.EXISTS.P unit slot.name)

(FACET.EXISTS.P slot facet.name)

(PUT.VALUES unit.name slot.name new-values)

(CREATE.MEMBER unit.name & optional member-of)

(UNITCREATE unit.name & optional supers member-of)

(CREATE.CLASS unit.name & optional supers)

(CREATE.SLOT unit slot.name)

SYSTEM AND METHOD FOR FRAME AND UNIT-LIKE SYMBOLIC ACCESS TO KNOWLEDGE REPRESENTED BY CONCEPTUAL STRUCTURES

BACKGROUND OF THE INVENTION

1. Field of the Invention

This invention relates to a system and method for symbolic access of conceptual structures stored in a memory and more particularly to such a system and method where frame and unit-like data is arranged in conceptual structures.

2. Description of Prior Art

Applications in the field of Artificial Intelligence utilize knowledge about the problem domain to solve problems in that domain. Knowledge is a particular kind of data. It can be particular facts, general rules or relevant relationships. In the world of data bases, knowledge corresponds to the meaning of the data as opposed to the data itself. This knowledge must be stored in the computer's memory and accessed by programs that run in the computer. Frames are the traditional data structure used for this and units are extensions to frames. They provide symbolic access to knowledge by allowing the computer program to reference them and their contents by name rather than by location or index. This invention provides a mapping of frames and units and their symbolic access capabilities to a new, graph based, knowledge representation called conceptual structures.

The theory of conceptual structures is explained in great detail in a book of the same name by John Sowa, Addison-Wesley, 1984. It is a graph based theory, using carefully defined kinds of graphs to represent knowledge. The present invention assumes some implementation of conceptual structures and extends that implementation to allow access to these graphs as frames or units. A mapping from frames or units to conceptual structures has not been given before, nor have algorithms been derived to support accessing conceptual structure as frames or units.

The theoretical base behind frames/units is ad hoc. It does not have a formal mathematical basis, but, because of its intuitive appeal and flexibility, it is widely used. The new theory, conceptual structures, has a well-defined mathematical basis. This invention shows that conceptual structures subsumes the capabilities of frames/units. The prior art has not included a process or method of representing frames with conceptual structures nor accessing conceptual structures symbolically as is done when accessing frames.

The present invention involves a useful application of a mathematically based knowledge representation technique called "conceptual structures".

In the following paragraphs, frames and conceptual structures will be briefly described and then a mapping will be described which shows how frames can be implemented with conceptual structures. This pattern will be repeated for successive features of frames.

Frames are a named data structure consisting of a set of named slots as defined by Patrick H. Winston and Berthold K. P. Horn in LISP published by Addison-Wesley, 1981. An example is a frame used to represent an airplane called Sopwith-Camel where each slot of the frame represents some characteristic of the plane, such as height and speed. Since frames are normally used in the programming language LISP, a LISP-like notation is used to describe a frame as follows:

(Sopwith-Camel
 (IS-A PLANE)
 (HEIGHT 600)
 (SPEED 300))

In this example Sopwith-Camel is the name of the frame and IS-A, HEIGHT and SPEED are slots with their respective values PLANE, 600 and 300.

Two functions are basic to frames, GET-VALUE and PUT VALUE. GET-VALUE takes two arguments, a frame name and a slot name, and returns the value associated with the slot. So (GET-VALUE 'Sopwith-Camel 'HEIGHT) would return 600 and (GET-VALUE 'Sopwith-Camel 'IS-A) would return PLANE. PUT-VALUE takes the same two arguments plus a new value for the named slot. Thus, (PUT-VALUE 'Sopwith-Camel 'SPEED 400) would change the frame to:

(Sopwith-Camel
 (IS-A PLANE)
 (HEIGHT 600)
 (SPEED 400))

The important thing to observe about the frame representation is that each slot establishes a named relationship between a frame and a value. For example, HEIGHT establishes a HEIGHT relationship between the frame Sopwith-Camel and the number 600. Also important is that the frame Sopwith-Camel and slots HEIGHT and SPEED are being used to represent the concepts of plane, height, and speed.

SUMMARY OF THE INVENTION

This invention shows how conceptual structures can be used to represent any knowledge that can be represented by frames/units. Its realization, in a software program called Unit Interface, provides a method of storing frame/unit data in conceptual structures and algorithms for accessing that data when stored in conceptual structures as if it were a frame/unit or collection of them. From the perspective of frames/units, the Unit Interface realization improves the organization of knowledge over frames/units and allows that data to be accessed as frames or conceptual structures. From the perspective of conceptual structures, the Unit Interface improves access to the knowledge and data stored in conceptual structures by allowing symbolic access to that knowledge and data.

BRIEF DESCRIPTION OF THE FIGURES

The present invention is described by reference to the drawings in which:

FIG. 2 is an illustration of the general structure of frames/units;

FIG. 3 is an illustration of examples of FIG. 2;

FIG. 4 is an illustration of a conceptual structures type lattice;

FIGS. 5, 6 and 7 are illustrations of examples of concept, relation, and actor types;

FIGS. 8 and 10 are representations of the general form of conceptual graphs for member and class frames/units;

FIGS. 9 and 11 are illustrations of examples of FIGS. 8 and 10, respectively;

DETAILED DESCRIPTION OF THE INVENTION

Figure 1:
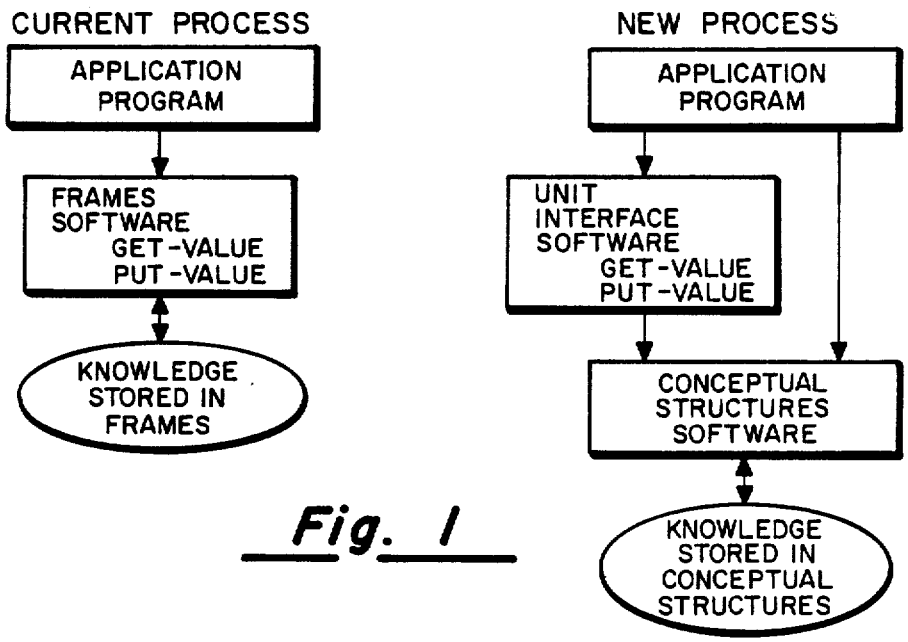
FIG. 1 is a schematic representation of current frame/unit based processes as compared to the conceptual structures based processes of the present invention.

Frames provide an established method of storing information, especially knowledge, in a computer system and processes for accessing and updating that information. Conceptual structures is a new improved storage method with different access and update processes. This invention provides a way to store information, especially knowledge, in conceptual structures and methods of accessing and processing the information as if it were stored in frames.

The conceptual graph part of conceptual structures has two kinds of nodes, concepts and relationships among them. In general, frames and the values of its slots map to concepts, and slots and facets map to relations. More specifically, the concept to which a frame maps is called the frame concept and the concept to which the value of a slot maps is called a value concept. Each slot maps to a relation connecting the frame concept to the corresponding value concept.

Both concepts and relations have type definitions. These definitions consist of a graph whose pattern of concepts and relations defines the type. In each defining graph there is a concept around which the definition focuses. It is called the "hub" of the definition. Concept types are used to define classes and superclasses. In their defining graphs, relations connected to the hub define inheritable "slots." Relation types are used to define these slots. In their defining graphs, relations connected to the hub correspond to "facets" of the slot.

A method of accelerating the access to such inheritable slots in a hierarchal data structure system is described in the U.S. Pat. No. 4,675,828 issued June 23, 1987 in the name of Gregory D. Cleenson, which is noted as being assigned on its face to Intellicorp Corporation, and entitled "Method and Apparatus for Building knowledge-based systems. This patent will be referred to as the KEE patent. KEE stands for Knowledge Engineering Environment and is a trademark of Intellicorp Corporation.

Knowledge is a particular kind of data. It can be particular facts, general rules or relevant relationships. In the world of data bases, knowledge corresponds to the meaning of the data as opposed to the data itself. Differences between data bases and knowledge base are outlined in the table below:

| DATA BASE vs. KNOWLEDGE BASES, SUMMARY | | |
|---|---|---|
| AREA | DATA BASES | KNOWLEDGE BASES |
| TABLE HEADING | SYNTACTICALLY IDENTIFIED | MEANINGS DEFINED |
| HEADING ROLE RELATIONSHIPS | NOT ADDRESSED | LOGICALLY DEFINED |
| FUNCTIONAL DEPENDENCIES | USED TO DEFINE TABLES | PRECEDURALLY DEFINED |
| OPERATIONS | RELATIONAL ALGEBRA (ACCESS & MANIPULATE) | LOGIC SYSTEM (REASON ABOUT) |

| DATA BASE vs. KNOWLEDGE BASES, SUMMARY -continued | | |
|---|---|---|
| AREA | DATA BASES | KNOWLEDGE BASES |
| DATA DESCRIPTION | DESCRIPTOR MAY DESCRIBE THOUSANDS OF RECORDS | DESCRIPTORS DESCRIBE DATA AND LOGICAL AND PROCEDURAL RELATIONSHIPS |

The implications of this are: Data base systems emphasize efficient storage and retrieval while knowledge base systems emphasize relationships and processes. Data base systems organize and store data items while knowledge based systems store logical, precedural and prototype relationships among classes of data items. The present invention addresses an alternative to the frames/units for storing the same kinds of information, especially knowledge.

More specifically, the new knowledge representation technique described by John Sowa, as noted above, is called Conceptual Structures. This technique utilizes conceptual graphs, type lattices, and data flow graphs. Conceptual graphs have two kinds of nodes, concepts and relations. The relations indicate how the concepts relate to each other via arcs between a relation and a concept. Concepts are contained in brackets, [and]. Relations are contained in parentheses, (and). Arcs are denoted by —> or <—. Actors (procedures) are contained in angle brackets, < and >Multiple arcs are denoted by a—followed by indented lines. A comma denotes the end of the list of multiple arcs. A period denotes the end of a graph. The corresponding conceptual graph for Sopwith-Camel would be displayed as:

[PLANE: Sopwith-Camel]—
—>(HEIGHT)—>[:600]
—>(SPEED)—>[:400],.

This graph says that there is some PLANE named Sopwith-Camel with HEIGHT and SPEED relations. The concept nodes have the form [type: referent]. In this graph the type is PLANE and the referent is the name Sopwith-Camel. The [:600] node contains just a referent name, 600. Referents are very general and can include a unique identifier. Thus we could have PLANE: [Sopwith-Camel #0578] which denotes not an arbitrary plane named Sopwith-Camel, but the concept of a specific plane #0578 which carries the name, currently, of Sopwith-Camel. The corresponding frame would be:

(Sopwith-Camel
 (IS-A PLANE)
 (IDENTIFIER #0578)
 (HEIGHT 600)
 (SPEED 400))

The mapping from frames/units to Conceptual Structures is:

| FRAMES | CONCEPTUAL STRUCTURES |
|---|---|
| FRAME NAME | NAME IN REFERENT OF FRAME CONCEPT |
| IS-A (Slot) | TYPE IN FRAME CONCEPT |
| IDENTIFIER (Slot) | ID IN REFERENT OF FRAME CONCEPT |
| SLOTS | RELATIONS |
| VALUES | REFERENTS IN VALUE CONCEPTS |

The classical frame representation has another level of detail. Each named slot consists of a slot name and a set of named facets which describe the slot. The value stored in the slot is, by convention, the value of the VALUE facet. Other typical facets are TYPE, DEFAULT, and UNITS. With facets the frame notation becomes:

(Sopwith-Camel
  (IS-A PLANE)
  (IDENTIFIER #0578)
  (HEIGHT
     (VALUE 600)
     (TYPE NUMBER)
     (UNITS FEET)
     (DEFAULT 1200))
  (SPEED
     (VALUE 400)
     (TYPE POSITIVE)
     (UNITS KNOTS)
     (DEFAULT 450)))

The GET-VALUE and PUT-VALUE functions are extended to optionally name a facet with the default being the VALUE facet. Thus, (GET-VALUE 'Sopwith-Camel 'HEIGHT 'UNITS) returns FEET, (GET-VALUE 'Sopwith-Camel 'SPEED 'TYPE) returns POSITIVE, (PUT-VALUE 'Sopwith-Camel 'HEIGHT 'UNITS 'meters) changes the value of the UNITS facet of HEIGHT to meters and, as before, (PUT-VALUE 'Sopwith-Camel 'SPEED 500) changes the value of the VALUE facet to 500. The important thing to notice is that each facet establishes a named relationship between a slot and a value and that each facet, such as UNITS, models some concept.

Each concept and relation is a member of a corresponding concept type or relation type in the second conceptual structure, the type lattice. The top of the lattice is the universal type and the bottom is the absurd type. All types in the lattice are partially ordered via a subtype operator which puts more general types higher in the lattice.

The label in the frame concept node, such as NUMBER in [NUMBER], identifies the type of the concept. All such labels are organized into a lattice called the type lattice The referent field represents the value as in [NUMBER: 600]. If there is a TYPE facet in the frame, its value becomes the value concept as shown below:

[PLANE: Sopwith-Camel]—
  —>(HEIGHT)—>[NUMBER: 600]
  —>(SPEED)—>[POSITIVE: 500],.

So far the VALUE and TYPE facets are handled in a direct way by conceptual graphs. This technique will not work for arbitrary facets and so a more general mapping is utilized for them. The basic technique is to think of each slot as a miniature frame and recursively apply the same technique. The basic problem is to find a natural way to associate a graph with a slot so that the graph can be used to represent the facets. In the conceptual graph above, HEIGHT and SPEED are relations and each is a member of a corresponding relation type whose name is in the type lattice. In the theory of conceptual structures each type in the lattice may have a type definition associated with it.

Type definitions consist of a conceptual graph that specifies a pattern of concepts and relations that defines the type. Slots are binary relations between the frame and a value. Thus, in conceptual structures, slots are modeled by a binary relation type in the type lattice. The graph specifying the pattern for the type definition has at least two concepts and one relation. The first concept of the pattern represents the frame, the relation represents the slot, and the second concept, called the hub, represents the value. Because conceptual graphs can have an arbitrary number of relations connected to a concept, the hub can have other relations connected to it. These each represent any facets of the frame, other than its type and value which are carried directly by the value concept. With this extension to the mapping, the type definitions for HEIGHT and SPEED are:

[PLANE]—>(HEIGHT)—>[NUMBER]—
  —>(UNITS)—>[:METERS]
  —>(DEFAULT)—>[:1200],.
[PLANE]—>(SPEED)—>[POSITIVE]—
  —>(UNITS)—>[:KNOTS]
  —>(DEFAULT)—>[:450],.

The mapping from frames/units to conceptual structures is now:

| FRAMES | CONCEPTUAL STRUCTURES |
|---|---|
| FRAME NAME | NAME IN REFERENT OF FRAME CONCEPT |
| IS-A (Slot) | TYPE IN FRAME CONCEPT |
| IDENTIFIER (Slot) | ID IN REFERENT OF FRAME CONCEPT |
| SLOTS | RELATIONS TO FRAME |
| VALUES (FACET) | REFERENT IN VALUE CONCEPT |
| TYPE (FACET) | TYPE IN VALUE CONCEPT |
| FACETS | RELATIONS TO SLOT TYPE'S HUB |

This mapping covers the basic frame with facets. It is common for frames to be extended in two ways. The first is to give special meaning to the IS-A slot's value which will be addressed next. The second is the idea of deamons which will be addressed later.

So far the value of the IS-A slot is just the name of another frame, PLANE. The user of frames gives the IS-A slot whatever semantics is desired. The normal extension is to modify the GET-VALUE function to interpret the IS-A value as a class definition. If GET-VALUE does not find a value in the VALUE facet, it looks in the frame belonging to the class for a value that can be inherited. Assume the frame for PLANE is:

(PLANE
  (IS-A PLATFORM)
  (HEIGHT
     (UNITS FEET)
     (TYPE NUMBER)
     (DEFAULT 1200)
  (SPEED
     (UNITS FEET)
     (TYPE POSITIVE)
     (DEFAULT 450)))

The value of doing this is being able to represent in one frame, PLANE, all data about planes that is common to all planes, including the specific plane, Sopwith-Camel. When this is done, Sopwith-Camel is simplified to:

(Sopwith-Camel
  (IS-A PLANE)
  (HEIGHT 600)
  (SPEED 500))

The GET-VALUE function now looks for a value locally and, if not found, looks in PLANE and, if not found there, looks in PLATFORM etc. So (GET-VALUE 'Sopwith-Camel 'UNITS) would return the inherited value FEET.

To map this to conceptual structures it is necessary to associate a graph with PLANE's type definition in the type lattice. Just as each relation type has a type definition associated with it that was used to define facets, each concept type in the lattice also has a type definition that can be associated with it. In this case it is used to hold the graph for PLANE which is a specialization or subtype of PLATFORM. Because PLANE is a subtype of PLATFORM, it is defined as a specialization of PLATFORM as follows:

[PLATFORM]—
—>(HEIGHT)—>[NUMBER]
—>(SPEED)—>[POSITIVE],.

This graph, when used as the type definition of PLANE, is interpreted as meaning that a PLANE is a kind of PLATFORM which has HEIGHT and SPEED. (The other facets are defined as part of the type definitions for HEIGHT and SPEED.)

The effect is to extend the mapping from frames/units to conceptual structures by adding on the end:

| FRAMES | CONCEPTUAL STRUCTURES |
|---|---|
| @ | |
| @ | |
| @ | |

SLOTS (INHERITED) RELATIONS OF FRAME'S TYPE'S HUB

All of the features of frames described up to this point are used to represent descriptive knowledge such as entities, attributes of them, and relationships among them. Besides descriptive knowledge, there is procedural knowledge. Daemons (as mentioned above), data base procedures, and active values are all kinds of procedural knowledge. It is the purpose of the data flow graphs part of conceptual structures to represent procedural knowledge. A frame representation of procedural knowledge is described below as is the mapping of this knowledge to data flow graphs.

Frames are often extended with special kinds of facets. IF-ADDED and IF-NEEDED are typical examples as follows:

(PLANE
 (IS-A PLATFORM)
 (HEIGHT
  (TYPE POSITIVE)
  (UNITS KNOTS)
  (DEFAULT 450)
  (IF-NEEDED CALC-HEIGHT)
  (IF-ADDED CHECK-HEIGHT))

The GET-VALUE function, e.g., (GET-VALUE 'Fokker 'HEIGHT) is modified to check if the VALUE facet of the height slot of Fokker has a value and, if not, it checks to see if the IF-NEEDED facet has a value. In this case it inherits CALC-HEIGHT from PLANE since Fokker IS-A PLANE. The value CALC-HEIGHT is interpreted as a procedure which, when executed, will return a new value for the VALUE facet which is then returned by GET-VALUE. The IF-NEEDED procedure can decide what to do about DEFAULT facets. If there is also no value for IF-NEEDED, GET-VALUE can check for inherited or default values.

A similar modification is made to PUT-VALUE so that, whenever it is called, it checks to see if there is an IF-ADDED facet and, if so, calls its value. In this case Fokker, being a PLANE inherits CHECK-HEIGHT which, presumably, verifies the integrity of the new value before PUT-VALUE is allowed to install that value in the VALUE facet.

Like conceptual graphs, data flow graphs also have two kinds of nodes, concepts and actors. Concepts are the same kind of node as in conceptual graphs and, in many cases, may participate in both graphs. A graph that has one or more concepts that participate in both conceptual and dataflow graph is called a bound dataflow graph. Actors are like "autonomous" procedures. When all the input concepts of an actor have a value (that is, they have referents), the actor can operate and, when it does, it produces values for each of its output concepts.

An example of a simple data flow graph is conversion from units of one kind to those of another as follows:
<FT2IN>—
<—[NUMBER: *x]—>(UNITS)—>[FEET]
—>[NUMBER: *y]—>(UNITS)—>[INCHES],.

The actor FT2IN converts one number, x, to another number, y. If a value, say 5, is asserted for x, the result is denoted by NUMBER: 5*x: In this case FT2IN acts like IF-ADDED. When a value is asserted for FT2IN's input, it can fire and produce a value for its output. When FT2IN fires, it produces a value for its output concept which would, in this case, be NUMBER : 60*y:. If it, y, also had actors associated with it, they then might become enabled to fire. Conversely, instead of asserting a value for x, one might be querying for a value for y. This is denoted by Number: *y?. In this case FT2IN acts like IF-NEEDED. When a value for y is queried, FT2IN is requested to fire or activate. If its input has a value, it is enabled and, if the input does not have a value, the query is propagated to its input.

For procedural knowledge, deamons in frames map to actors in data flow graphs. The complete mapping from frames/units to conceptual structures covering classes, instances, inheritance, and deamons is:

| FRAMES | CONCEPTUAL STRUCTURES |
|---|---|
| FRAME NAME | NAME IN REFERENT OF FRAME CONCEPT |
| IS-A (Slot) | TYPE IN FRAME CONCEPT |
| IDENTIFIER (Slot) | ID IN REFERENT OF FRAME CONCEPT |
| SLOTS | RELATIONS TO FRAME CONCEPT |
| VALUE (FACET) | REFERENT IN VALUE CONCEPT |
| TYPE (FACET) | TYPE IN VALUE CONCEPT |
| FACETS | RELATIONS OF SLOT TYPE'S HUB |
| SLOTS (INHERITED) | RELATIONS OF FRAME'S TYPE'S HUB |
| DEAMONS | ACTORS |

FIG. 1 represents current frame/unit based processes compared to the conceptual structures based processes of the present invention. The previously described material is reviewed below with reference to FIGS. 2-13 to further illustrate in a more formal manner the mapping from the prior frame/unit based representation to the new conceptual structures based representation.

FIG. 2 illustrates the general structure of a frame/unit. In it, unit-name 1 corresponds to the name of some frame/unit. The frame/unit 2 is denoted by a framelike rectangle. The interior of a frame unit consists of a set 3, 5, 7 of named slots, 4, 6, 8. By convention the first slot 4 and its name 3 corresponds to the IS-A slot for frames or the class/superclass slot for units. Subsequent slots such as 5, 6 each consist of a set 9, 11 of named facets 10, 12.

FIG. 3 illustrates examples of two frames/units, PLANE 13 and SOPWITH-CAMEL 14. PLANE 13 has a SUPER CLASS 15 whose value is PLATFORM 16. PLANE 13 also has slots HEIGHT 17 and SPEED 18. Slot HEIGHT 17 has facets TYPE 19 with value NUMBER 20, UNITS 21 with value FEET 22, DEFAULT 23 with value 1200 24, IF-NEEDED 25 with value CALC-HEIGHT 26, and IF-ADDED 27 with value CHECK-HEIGHT 28. The slot SPEED 18 has facets similar to slot HEIGHT 17.

Similarly, frame/unit SOPWITH-CAMEL 14 has a CLASS 29 whose value is PLANE 30. To link frames together, the value stored for PLANE 30 designates the unit/frame PLANE 13. SOPWITH-CAMEL 14 has its own slots. HEIGHT 31 has value 600 32 and SPEED 33 has value 500 34.

PLANE 30 is an example of a class and PLATFORM 16 is an example of a super class. Classes and super classes correspond to TYPES in Conceptual Structures. To organize them and provide a sound mathematical base for them, they are mapped into a type lattice. The general form of a type lattice is shown in FIG. 4. Lattices, by definition, must have a top and bottom node. In conceptual structures these are called the universal (UNIV 35) and (ABSURD 40) types. There are three basic kinds of types, CONCEPT-TYPES 36, RELATION-TYPES 37, and ACTOR-TYPES 38 which are the head nodes of the respective parts of the lattice. In FIG. 4, REST OF LATTICE 39 may denote many possible levels of nodes in the lattice.

FIG. 5 gives the CONCEPT-TYPES part of the type lattice for the PLANE 13 and SOPWITH-CAMEL 14 frames/units. CONCEPT-TYPES 41 and ABSURD 46 correspond to their counterparts in FIG. 4. Note that PLATFORM 42 is a subtype of CONCEPT-TYPES 41 and has a subtype of PLANE 43. Since POSITIVE 45 is a special kind of number, it is a subtype of NUMBER 44.

Figure 6:
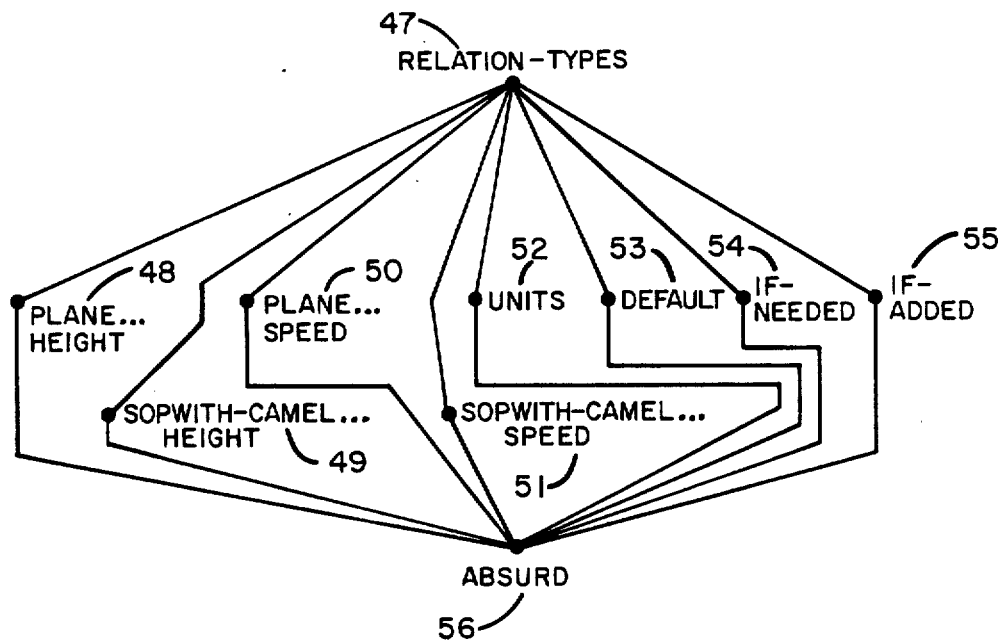

FIG. 6 gives the RELATION-TYPES part of the type lattice for the PLANE 13 and SOPWITH-CAMEL 14 frames/units. RELATION-TYPES 47 and ABSURD 56 correspond to their counterparts in FIG. 4.

Note that some of the type labels are compound names joined by an ellipse such as PLANE . . . HEIGHT 48. This is because there are two slots named HEIGHT and two named SPEED. In frames/units all slots for each frame/unit are unique to it. Conceptual structures does not have this restriction. Thus, to distinguish slots with the same name, their name in the type lattice is formed by concatenating the frame/unit name, the ellipse, and the slot name. In this way PLANE . . . HEIGHT 48, SOPWITH-CAMEL . . . HEIGHT, 49 PLANE . . . SPEED 50, and SOPWITH-CAMEL . . . SPEED 51 are formed.

Also shown in FIG. 6 are relation-types for the facets of PLANE 13. Since facets only require their name and value for most frame/unit implementations, it is not necessary to distinguish types for each slot and each frame/unit. Those shown in FIG. 6 of UNITS 52, DEFAULT 53, IF-NEEDED 54, and IF-ADDED 55 correspond to those shown in FIG. 3.

Figure 7:
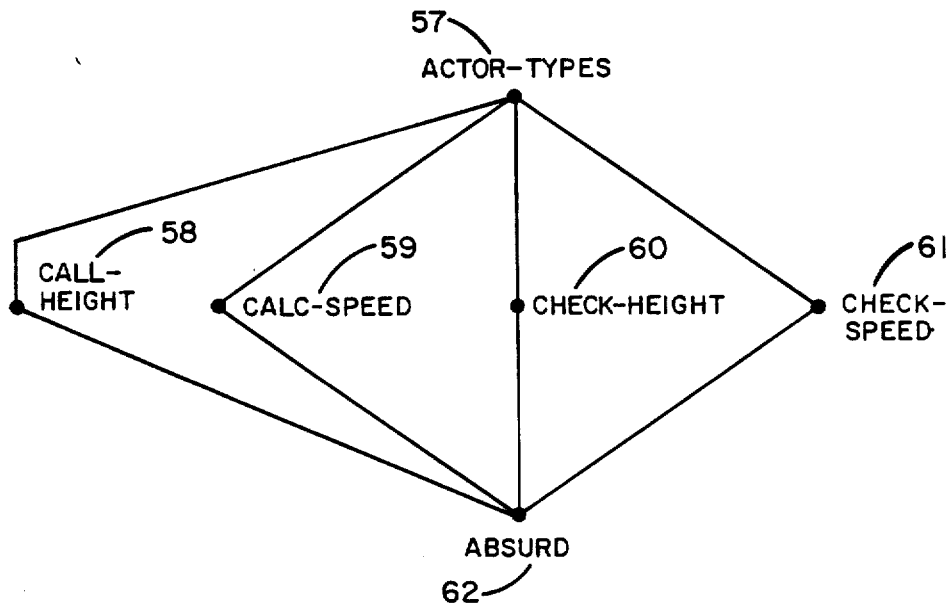

FIG. 7 gives the ACTOR-TYPES part of the type lattice for the PLANE 13 and SOPWITH-CAMEL 14 frames/units. ACTOR-TYPES 57 and ABSURD 62 correspond to their counterparts in FIG. 4.

There is, in effect one actor type for each kind of deamon. The value of the IF-NEEDED 25 facet of the HEIGHT 17 slot of PLANE 13 is the name of actor type CALC-HEIGHT 58. The type definition for an actor such as CALC-HEIGHT 58 allows either or both (1) a data flow graph defining it in terms of other actors and concepts and (2) a procedure/function. The application program (e.g., inference engine or simulation program) knows how to interpret these definitions if an input to an actor of type CALC-HEIGHT 58 is asserted or an output is queried.

Similarly, the value of the IF-ADDED 27 facet to the same HEIGHT 17 slot of PLANE 13 is the name of actor type CHECK-HEIGHT 60. Also, actor types CALC-SPEED 59 and CHECK-SPEED 61 are the values of IF-NEEDED and IF-ADDED facets for slot SPEED 18 of PLANE 13.

To summarize, FIGS. 2 and 3 define and give examples of frames/units. Conceptual graphs and data flow graphs are used to represent frames/units in conceptual structures. The concepts, relations, and actors that occur in these graphs are members of a corresponding concept type, relation type, and actor type respectively. These types are arranged into a lattice as defined in FIG. 4 and illustrated in FIGS. 5, 6 and 7.

FIG. 8 shows the general structure for representing a member frame/unit as a conceptual graph. Concept CLASS-SLOT:unit-name 63 is the analog of the frame/unit. It is called the frame concept. The type field of the frame concept, labeled CLASS-SLOT, names the class of which this concept (frame/unit) is a member. The referent field of the frame concept, labeled, unit-name, contains the name of the frame/unit. For each slot of the member frame/unit a binary relation is added to the graph. There are arcs from the frame concept to the relation and from the relation to a value concept. The name of the relation is composed of (1) the unit-name of the frame concept, (2) an ellipse, and (3) the slot name of the frame/unit. These relations are denoted in FIG. 8 by slot-names 64 and 66.

Each slot maps to a relation which links to a value concept. The type field of each of these value concepts 65 or 67 corresponds to the value of the TYPE facet of the slot. The referent field of a value concept 65 or 67 corresponds to the value of the VALUE facet of the slot; that is, to the value of the slot.

FIG. 9 gives an example of a conceptual graph for a member frame/unit, SOPWITH-CAMEL 14. It is of type PLANE with unit-name SOPWITH-CAMEL so the frame concept is PLANE:Sopwith-Camel 68. Its two slots HEIGHT 31 and SPEED 33 map to relations sopwith-camel . . . height 69 and sopwith-camel . . . speed 71. The values for the two slots map to value concepts NUMBER:600 70 and POSITIVE:500 72.

Figure 10:
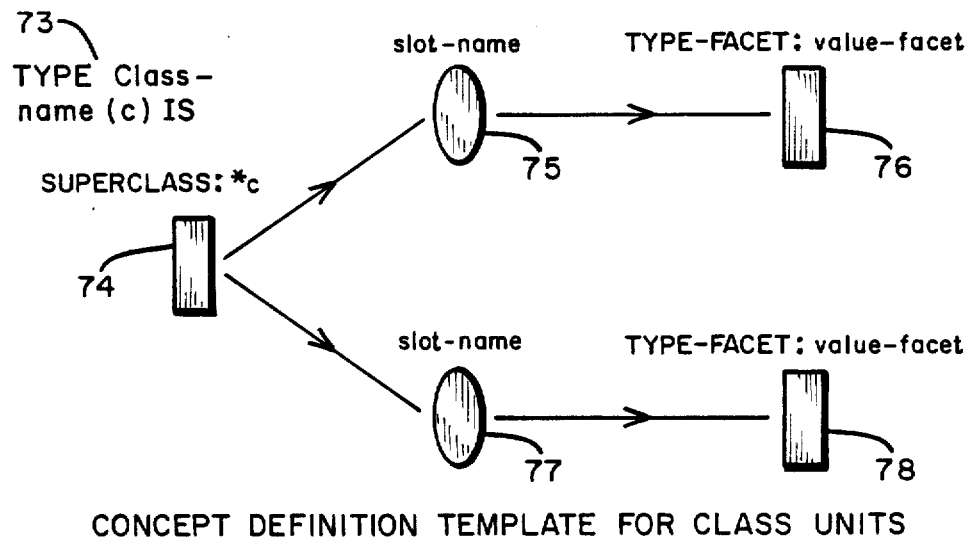

FIG. 10 shows the general structure for representing class frames/units as TYPE definition graphs. Conceptual structures have extended notations for defining types. TYPE class-name(c) IS 73 is an example of this extended notation. It defines class-name as a type in the type lattice. The "c" in parentheses is like a formal parameter. This notation is followed by a graph giving this definition. The concept in this graph which has the parameter "c" as a variable, "*c", is called the hub of the definition graph. The type field of the hub gives the superclass of the class being defined.

For each slot of the class frame/unit a binary relation is added to the graph. There are arcs from the hub to the relation and from the relation to a value concept. The name of the relation is composed of the class-name, (an ellipse), and the slot-name. These relations are denoted in FIG. 10 by slot-names 75 and 77. As with member frames/units, each slot maps to a relation which links to a value concept. The type field of each of these value concepts 76 or 78 corresponds to the value of the TYPE facet of the slot. The referent field of such a value concept 76 or 78 corresponds to the value of the VALUE facet of the slot; that is, to the value of the slot.

Figure 11:
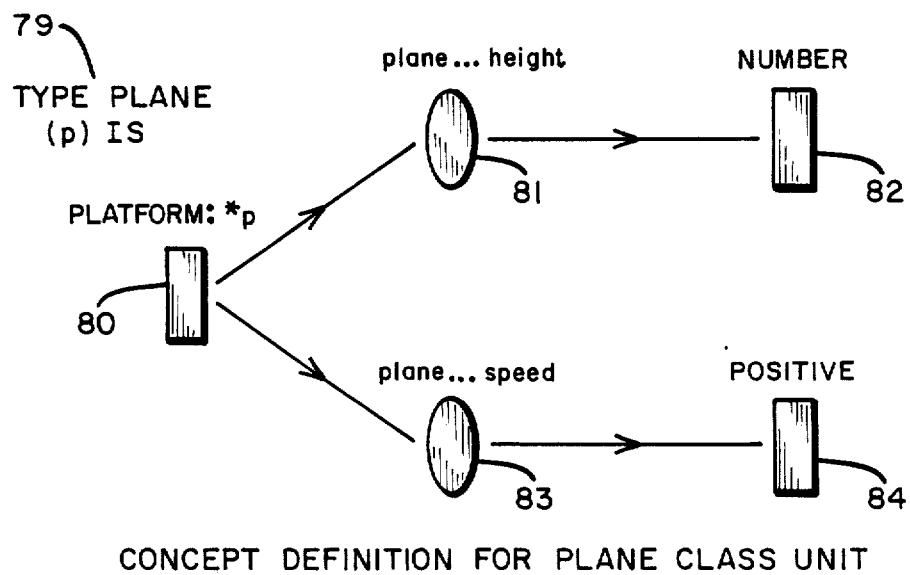

FIG. 11 gives an example of a concept TYPE definition for class frame/unit, PLANE 13. It is represented by a class or type definition specified by TYPE PLANE (p) IS 79 followed by a definition graph. Its super class is PLATFORM and the parameter is "p" so the hub concept is PLATFORM:*P 80. Its two slots HEIGHT 17 and SPEED 18 map to relations plane . . . height 81 and plane . . . speed 83. The values for the two slots map to value concepts NUMBER 82 and POSITIVE 84.

Figure 12:
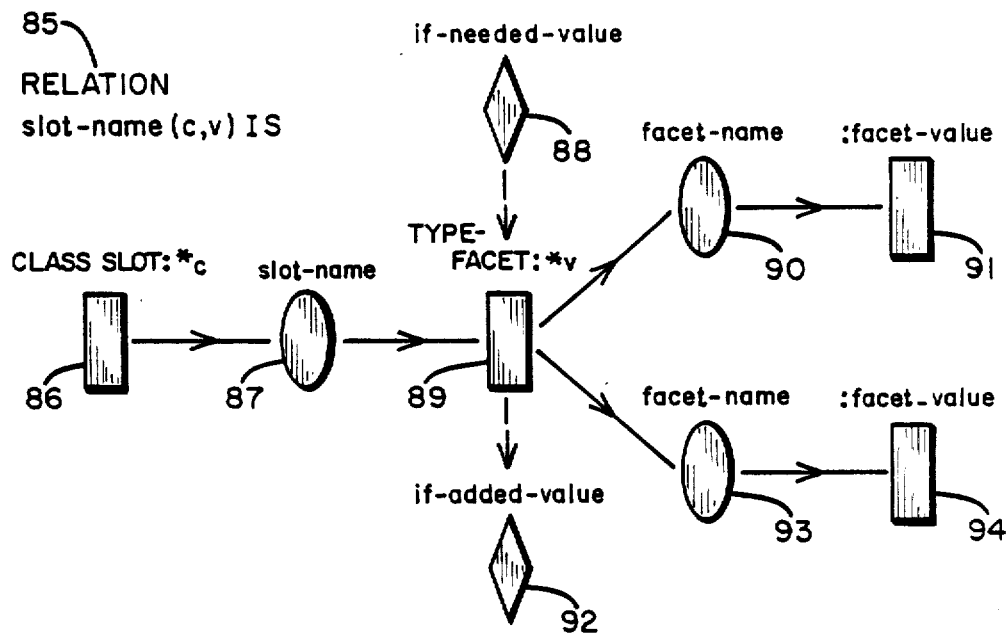
FIG. 12 is an illustration of how facets and deamons are represented.

FIG. 12 shows the general structure for representing facets and deamons. The conceptual structures extended notation for defining relation types is RELATION slot-name (c,v) IS 85 followed by a definition graph. As with concept type definitions, in (c,v) the "c" and "v" identify formal parameters.

The definition graph specified a pattern for the relation. For slots these patterns are all binary relations between a frame concept and a value concept. The relations are denoted in the graph by a slot-name 87 which is composed of the frame/unit name, an ellipse, and the slot's name.

The frame and value concepts are represented in the graph by the concepts that have the formal parameters as referents, class-slot:*c 86 and type-facet:*v 89 in FIG. 12. The class-slot names the type of member frame/unit or the class itself in the case of a class frame/unit. The type-facet is the value of the TYPE facet, if any, for the slot. Concept type-facet:*v 89 is the hub of the relation definition.

As with hubs in class type definition graphs, hubs of relation definition graphs have things connected to them that provide definitions. Relations connected to the hub define facets 90 and 93 and link to corresponding facet value concepts 91 and 94 that represent the values of the facets.

Also linked to the hub are actors. If there are values for the IF-NEEDED facet, they become the names of input actors. Actors with an input to the hub, such as if-needed-value 88, can generate a value for the slot. If there are values for the IF-ADDED facet, they become the names of output actors. Actors with an output from the hub, such as if-added-value 92, uses the value of the slot.

Figure 13A:
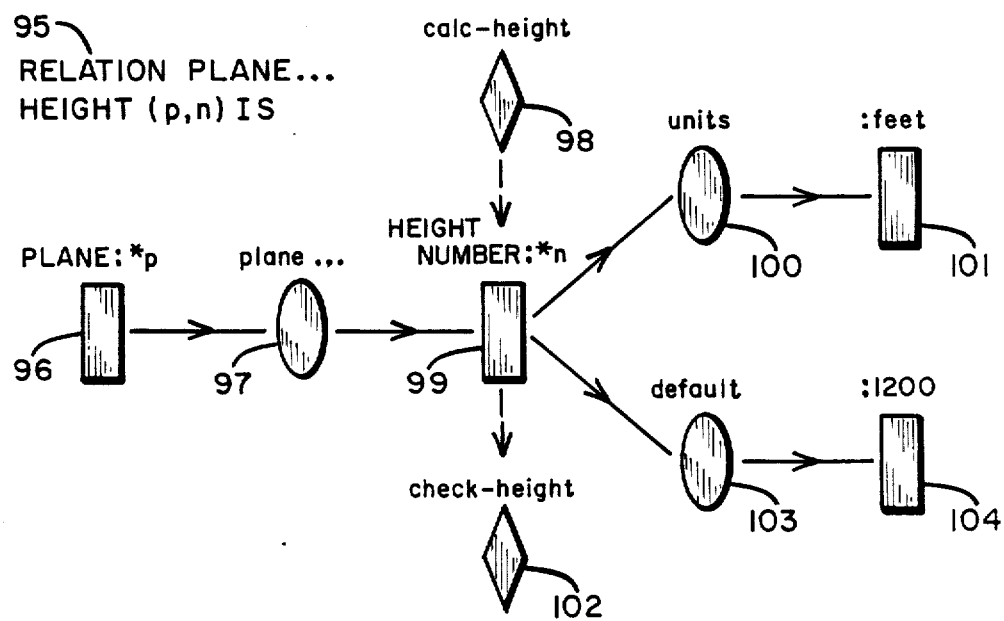
FIGS. 13 a and b are is an illustration of examples of FIG. 12.
Figure 13B:
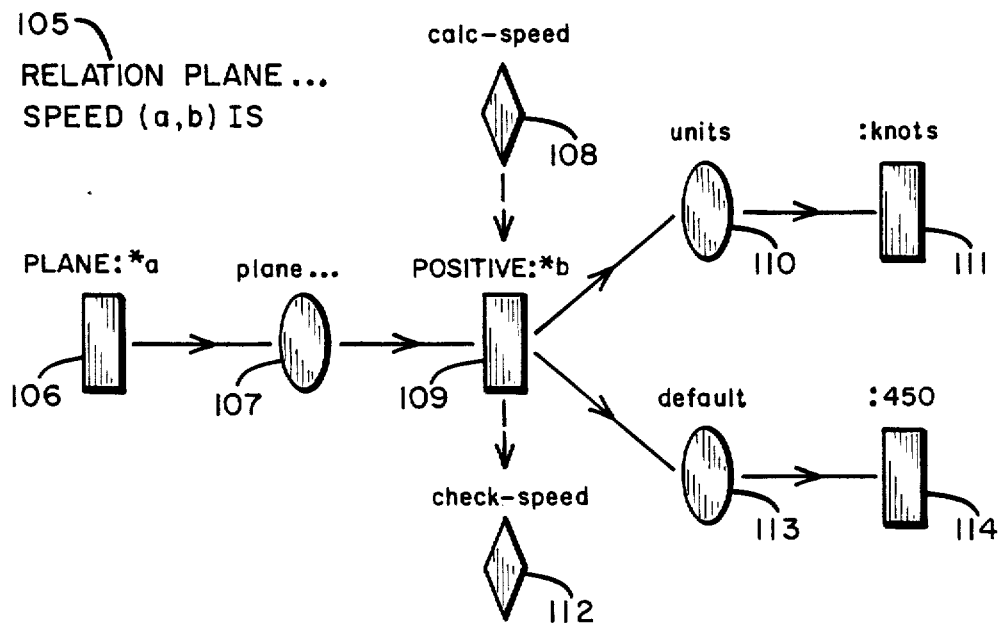

FIG. 13 shows examples of relation type definitions being used to define facets of the HEIGHT 17 and SPEED 18 slots of frame/unit PLANE 13. RELATION PLANE . . . HEIGHT (p,n) IS 95 specifies that the graph that follows defines the PLANE . . . HEIGHT relation type. Its frame concept is PLANE:*p 96 which is linked by relation PLANE . . . HEIGHT 97 to hub NUMBER:*n 99. Its type, NUMBER, is the value 20 of the TYPE 19 facet of the HEIGHT 17 slot of frame/unit PLANE 13. Relations connected to it, units 100 and default 103, identify facets of HEIGHT 17. Their values are given, respectively, by concepts :FEET 101 and :1200 104.

Since HEIGHT 17 has an IF-NEEDED 25 facet, its value, CALC-HEIGHT 26, becomes the name of an input actor calc-height 98. Similarly, HEIGHT 17 has an IF-ADDED 27 facet with value check-height 28 which becomes the name of an output actor check-height 102. The same pattern is repeated for slot SPEED 18 whose IF-NEEDED and IF-ADDED facet values become actors calc-speed 109 and check-speed 112.

As for slot HEIGHT 17, slot SPEED 18 is specified by a relation type definition of RELATION PLAN . . . SPEED (a,b) IS 105. It is followed by a definition graph with frame concept PLANE:*a 106, relation plane . . . speed 107 and hub POSITIVE:*b 109. Relations connect to the hub, UNITS 110 and DEFAULT 113 identify facets of SPEED 18. Their values are given, respectively, by concepts :knots 111 and :450 114.

This completes the detailed description of the mapping from frames/units to conceptual structures. The algorithms for the storing frames/units in conceptual structures and accessing those structures as if they were frames/units are described in the next section. These algorithms also allow conceptual structures to be accessed symbolically.

OPERATION OF THE PROGRAM

This section describes the computer program called Unit Interface. It implements the mapping and algorithms that allow frames/units to be stored in conceptual structures and still be accessed as if they were frames/units. Unit interface utilizes another computer program to create, access and manipulate conceptual structures. The one used to test the Unit Interface is called CONSTRUCT TM, which is a trademark of Unisys Corporation, but similar programs could be used.

The Unit Interface program is divided into several parts. The first part deals with knowledge bases. A knowledge base is a collection of related frames/units. It typically consists of some portion of a large class-subclass hierarchy and members of that portion. In the Unit Interface each knowledge base corresponds to a conceptual structure's canon. A canon includes a type lattice for the classes, conceptual graphs for the members, and definition graphs for slots and facets. The knowledge base part of Unit Interface provides functions to find, create, test, manipulate, and delete knowledge bases.

The second part of Unit Interface deals with units. It provides functions to find, create, test, manipulate, and delete units of a knowledge base. This includes both class and member units which are stored in conceptual structures as described in the previous section. These functions are used by the knowledge base functions and use the following slot functions.

The third part of Unit Interface deals with slots. It provides functions to find, create, test, manipulate, and delete slots of a unit. The slots are represented in conceptual structures as described in the previous section. These functions are used by the unit functions and use the following facet functions.

The fourth part of Unit Interface deals with facets. It provides functions to find, create, and manipulate facets of a slot. The facets are represented as described in the previous section. These functions are used by the slot functions.

The fifth part of Unit Interface deals with values of slots and facets. It provides functions to get, put, and add values. Because the referent field of a value concept can hold sets, it is possible to represent multiple valued slots and facets in a natural way. Thus, it is necessary to be able to replace (with put functions) the entire value with one or more new values, to be able to append (with add functions) new values to existing values, and to be able to access (with get functions) either the value (if single valued) or the first value (if multiple values).

When a unit has parents, either class or superclass, its slots can inherit values from the slots of those parents. Thus, even if a slot of a unit has no local value, the GET.VALUES function applied to it may produce one or more inherited values. The value returned by get functions is a derived value which is defined by combining any local value with possible inherited values. Most systems only have one way that the local and inherited values are combined, while Unit Interface provides for many named combining functions. Which combining function to use is stored as the value of an INHERITANCE.ROLE facet, which may itself be inherited. The GET functions are also used to obtain it.

The sixth part of Unit Interface deals with loading knowledge bases from files. In addition, this part provides functions to load knowledge bases that have been stored in conceptual structures form.

The seventh and last part of Unit Interface deals with saving knowledge bases. It provides functions which (1) print a facet of a slot, (2) print a slot of a unit using 1 for each facet of the slot, (3) print a unit of a knowledge base using 2 for each slot of the unit, and print a knowledge base using 3 to print each unit of the knowledge base. The knowledge base can be saved either in the format of the commercial program or in conceptual structures form.

EXPLANATION OF FLOWCHARTS FOR CODE

FIGS. 14–22 show a set of flowcharts for the following functions which form part of Unit Interface:

|                  |           |
|------------------|-----------|
| GET.VALUES       | (FIG. 14) |
| UNIT.EXISTS.P    | (FIG. 15) |
| SLOT.EXISTS.P    | (FIG. 16) |
| FACET.EXISTS.P   | (FIG. 17) |
| PUT.VALUES       | (FIG. 18) |
| UNITCREATE       | (FIG. 19) |
| CREATE.MEMBER    | (FIG. 20) |
| CREATE.CLASS     | (FIG. 21) |
| CREATE.SLOT      | (FIG. 22) |

These functions constitute the kernel of the code for the present invention. They consist of GET.VALUES with the supporting functions it needs (UNIT.EXISTS.P, SLOT.EXISTS.P and FACET.EXISTS.P) and PUT.VALUES with the supporting functions it needs (UNITCREATE, CREATE.CLASS, CREATE.MEMBER and CREATE.SLOT).

The following paragraphs explain the above-noted flowcharts. For each an example will be used from previous figures.

Figure 14:
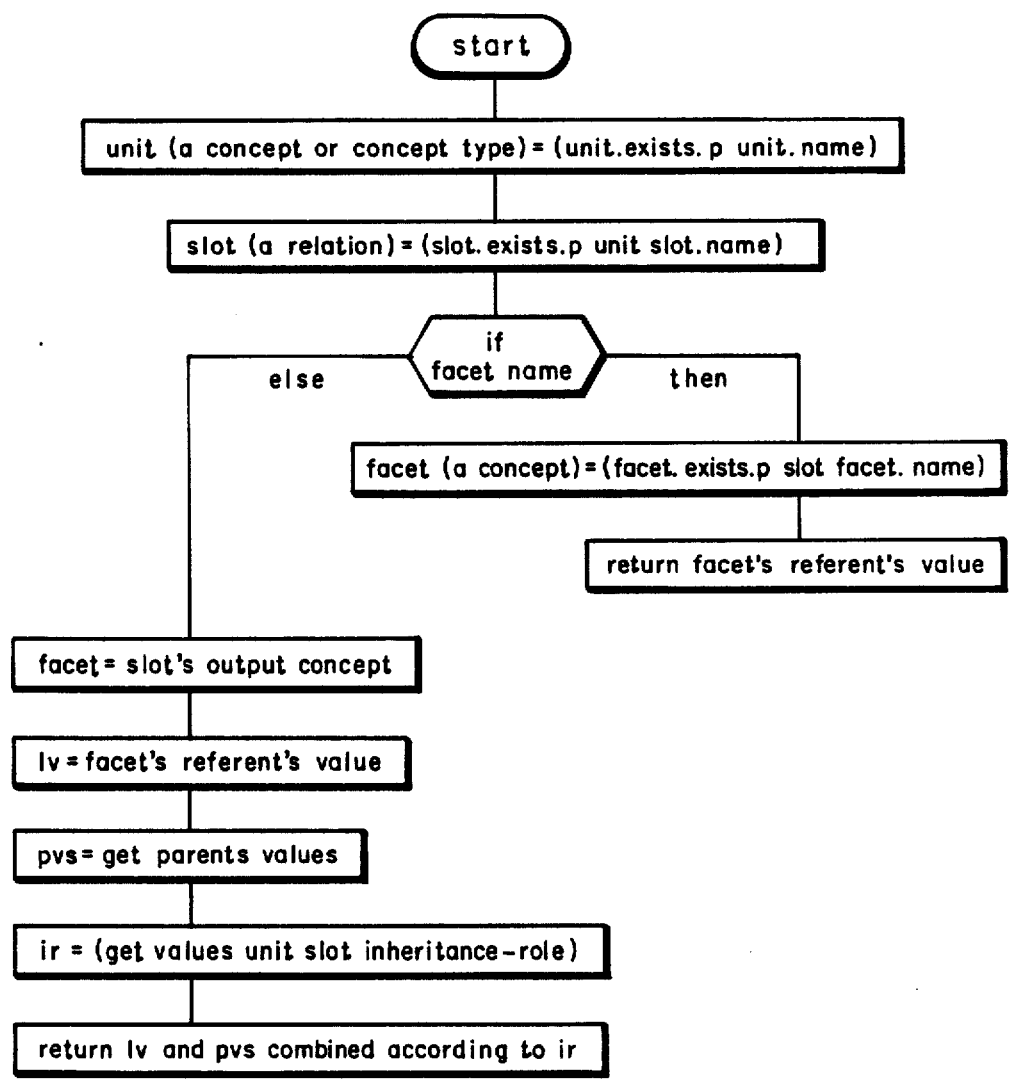
FIG. 14-22 show a set of flowcharts for various functions used in the system.

The first flowchart, shown in FIG. 14, is for GET.VALUES. The example is taken from FIG. 9. It is: (GET.VALUES 'Sopwith-Camel 'height) In this call, according to the parameters shown at the top of FIG. 14, 'Sopwith-Camel is bound to unit.name, 'height is bound to slot.name and, since no facet.name was included in the above call, facet.name is nil. The first step of the flowchart assigns a value to local variable unit. The value is the result of executing (UNIT.EXISTS>P 'Sopwith-Camel). Its flowchart is explained in the next flowchart. The result of executing this call is the concept representing PLANE:Sopwith-Camel. It is labelled by number 68 in FIG. 9 and is denoted as concept-68.

The second step of the flowchart assigns a value to local variable slot. The value is the result of executing (SLOT.EXISTS.P concept-68 'height). The result of executing it, as explained below, is the relation representing the 'height slot. It is labelled by number 69 in FIG. 9 and is denoted as relation-69.

At step three, since there is no facet.name, the else path is taken. The fifth step assigns a value to the local variable facet. The value is the output concept of slot. Since slot is relation-69, the value assigned to facet is the concept representing NUMBER:600, labeled 70 in FIG. 9. The next step is to assign its value, 600, to local variable l v. Following that, the local variable pvs is assigned a list of the values of each parent. In this case, Sopwith-Camel's parent is PLANE and its height slot is relation-81, labeled 81 in FIG. 11. It does not have a value so pvs is assigned nil. The implementation described herein does not store the "inherited value".

The next step is to obtain the inheritance-role of the slot. It is always stored as a facet of the slot and can be obtained by using GET.VALUES recursively. In this case, since there isn't an inheritance-role, the default of OVERRIDEVALUES is used. It means that any local value, such as the 600, overrides any inherited values from parents. In general, the value of the inheritance-role is viewed as naming an algorithm by which the local value, l v, and values inherited from parents, pvs, are to be combined. This combining is done by the last step. In this case the local value of l v, 600, overrides the inherited values of any parents contained in pvs, nil. The result is that the value of l v, 600, is returned. Thus, (GET.VALUES 'Sopwith-Camel 'height)—>600

Figure 15:
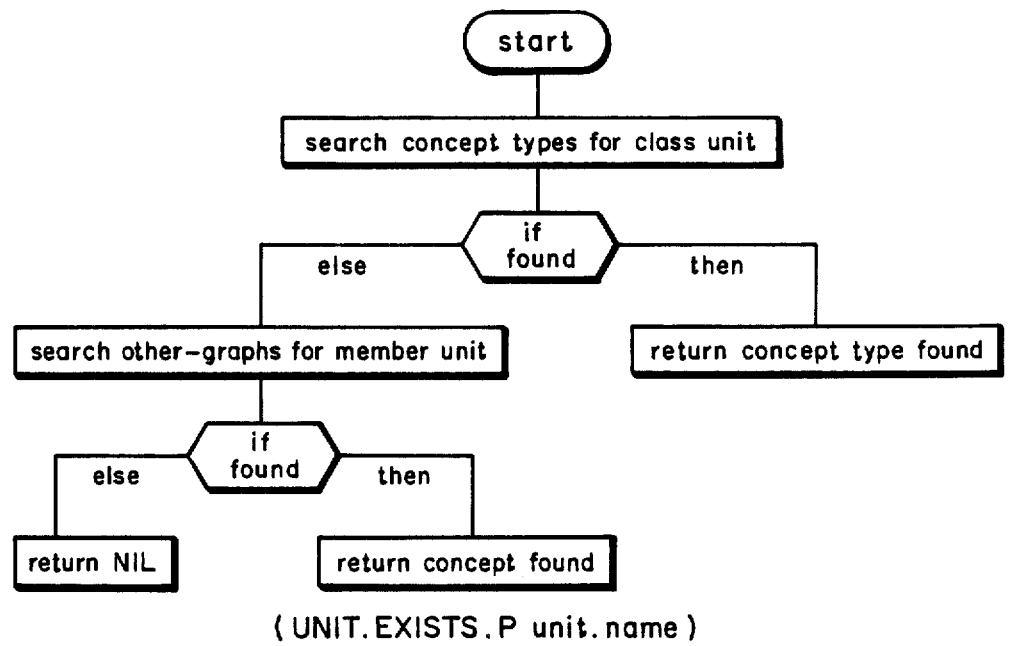

The next flowchart to be explained is for UNIT.EXISTS.P and is shown in FIG. 15. The example is taken from above, where GET.VALUES calls UNIT.EXISTS.P as follows:

(UNIT.EXISTS.P 'Sopwith-Camel)—>concept-68

In this call, according to the parameter shown at the top of FIG. 15, 'Sopwith-Camel is bound to unit.name. Since there are two kinds of units, class units and member units, the algorithm first searches for one and, if not found, then searches for the other. The first step is to search the concept types. These are represented in FIGS. 4–7. Since Sopwith-Camel is a member of type PLANE, it is not found when searching the type lattice. Since that search failed, the next step is to search through all member units. These are stored, for each knowledge base or canon with the record that represents the canon in the field called other-graphs. In this case, the unit denoted by concept-68 (labelled 68 in FIG. 9) is found which has the name Sopwith-Camel. Consequently, it (concept-68) is returned.

Figure 16:
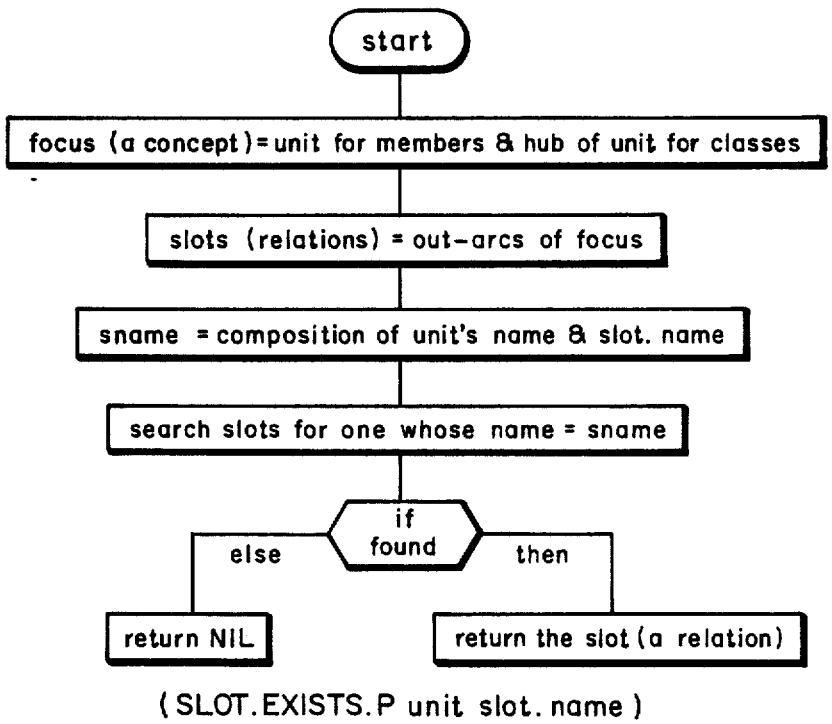

The next flowchart is for SLOT.EXISTS.P in FIG. 16. The example is taken from above, where GET.VALUES calls SLOT.EXISTS.P as follows:

(SLOT.EXISTS.P concept-68 'height)—>relation-69

In this call concept-68 is bound to unit and 'height is bound to slot.name. The focus depends on whether unit is a class or member unit. The focus is the concept of the class or member unit to which the relations representing slots are connected. For member units it is the concept representing the unit and for class units it is the hub of the lambda abstraction defining the class. The hub is the concept in the defining graph which represents the concept being defined. In this case, since unit is a member unit, the focus is concept-68.

The second step is to find all the relations that represent slots of the unit. These are just the out-arcs of the focus. In this case focus is concept-68, its out-arcs are relation-69 and relation-81, and they are assigned as the value of local variable slots. The third step is to assign to local variable sname 'sopwith-camel . . . height which is the composition of the names of the unit and slot. The fourth step is to search the slots for one whose name matches sname. In this case the search is successful and relation-69 is found and returned.

The next example was chosen to illustrate the other major patch through the GET-VALUES function. This path occurs when a facet.name is given. In this case we want the value of the 'units facet of the 'height slot of the 'PLANE unit.

(GET.VALUES 'PLANE 'height 'units)—> 'feet

Refer again to FIG. 14. The first step is to assign a value to the local variable unit. In this case (UNIT.EXISTS.P 'PLANE)—>concept-type-43 because the search for the unit name of 'PLANE in the type lattice is successful. It finds a concept-type, as shown in FIG. 5, with the name 'PLANE which is labeled concept-type 43. The second step is to assign a value to the local variable slot. In this case (SLOT.EXISTS.P concept-type-43'height)—>relation-81

The third step is to decide if a facet.name was specified. This time it is and has the value 'units. The next step is to assign a value to the local variable facet. The value is obtained by evaluating FACET.EXISTS.P which returns concept-101 as explained below. Its referent's value is 'feet, as shown in FIG. 13, and is returned as the value for the call to GET.VALUES.

Figure 17:
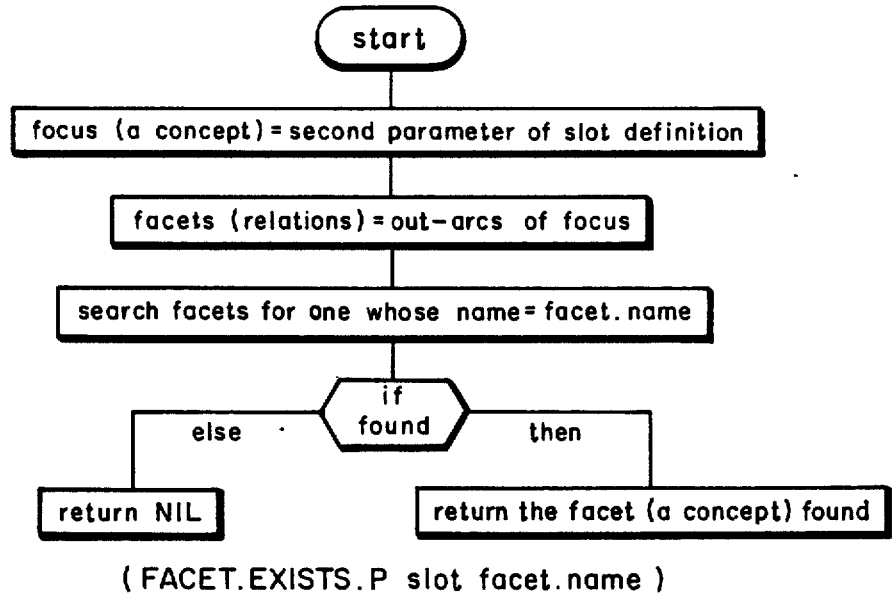
Figure 18:
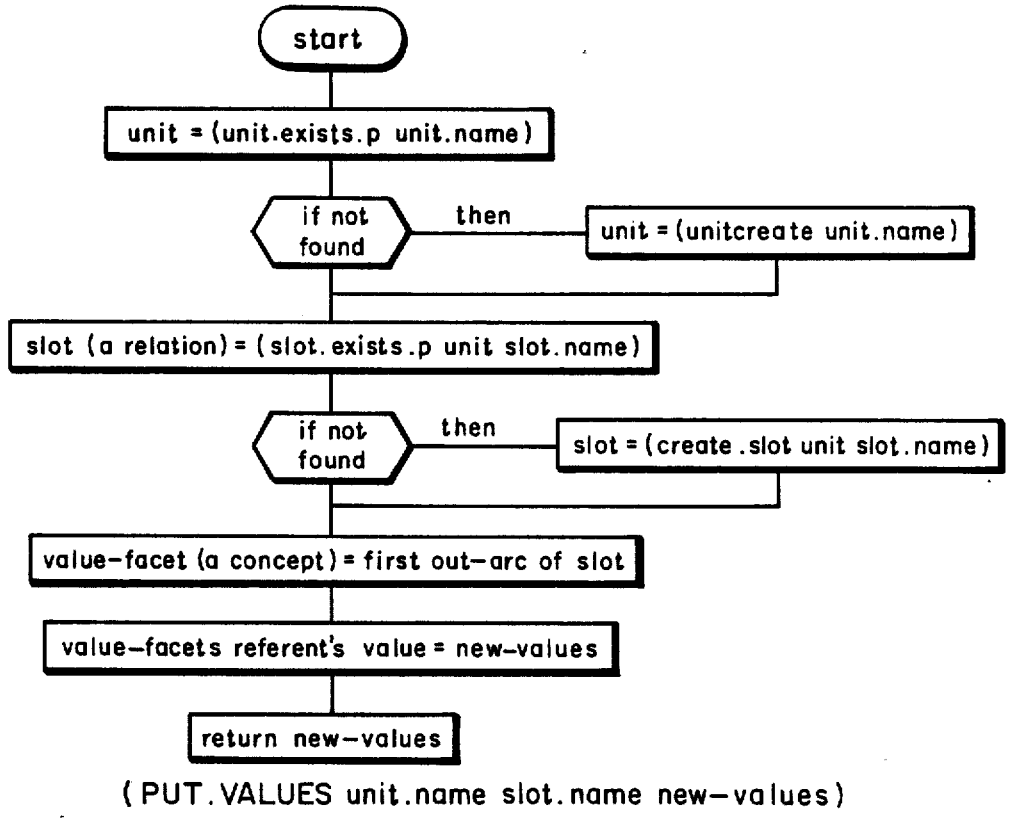

The next flowchart is for FACET.EXISTS.P which is shown in FIG. 17. The example is taken from above and is:

(FACET.EXISTS.P relation-81 'units)—>concept-101

In this call relation-81 is bound to slot and 'units is bound to facet.name. Since the value of the slot parameter, relation-81, is a relation, it has a type definition corresponding to its name, plane . . . height. The type of the relation is found directly from the relation using a pointer in relation-81 to its type definition. The type for plane . . . height is labeled 48 in FIG. 6.

All slots are represented by binary relations. It is binary because the slot relates a unit to a value. Thus, the definition must include both. The type representing a slot is defined by a lambda abstraction specifying its definition graph. The definition graph includes concepts that represent both the unit and the slot's value. Consequently, the lambda abstraction has two parameters. The first one is the concept in the defining graph which corresponds to the unit to which the relation applies. It is PLANE in this case. The second one is the concept in the defining graph which corresponds to the slot's value. This is called the "focus". Pointers to these parameters can be accessed directly from the type definition for relation-81. The second one corresponds to concept NUMBER:*n, labeled 99 in FIG. 13.

It should be noted that the particular data structures for storing the types, graphs, concepts, relations, actors, referents, etc. for some implementation of conceptual structures are not of concern here. This disclosure is only concerned with the implicit use of those data structures to represent units, slots and facets. Since lambda abstractions are part of the conceptual structures theory, all implementations will use them to represent the graphs defining the types.

The second step is to find all the facets that could apply. These are assigned as the value of local variable facets. They are simply the out-arcs of the focus. In this case they are relation-100 and relation 103. The third step is to search the facets for one whose name is the same as facet.name, units. The last step is to return the concept found, concept-101.

This completes explaining the flowcharts for GET.VALUES and its supporting functions: UNIT.EXISTS.P, SLOT.EXISTS.P and FACET.EXISTS.P. Next is the explanation of the flowcharts for PUT.VALUES and its supporting functions UNITCREATE, CREATE.CLASS, CREATE.MEMBER, and CREATE.SLOT.

The example is to update the value of Sopwith-Camel's height by executing:

(PUT.VALUES 'Sopwith-Camel 'height 625)—>625

The first step is to find the unit for Sopwith-Camel if it exists by executing the UNIT.EXISTS.P function. The value returned, in this case concept-68, is assigned to the local variable unit. The second step is to test whether a unit already existed or not and create one for it if it didn't. Creating a new unit is accomplished by executing the UNITCREATE function which is explained below.

The third step is to find the height slot of unit if it exists by executing the SLOT.EXISTS.P function. The value returned, in this case relation-69, is assigned to the local variable slot. The fourth step is to test whether a slot already existed or not and create one for it if it didn't. Creating a new slot is accomplished by executing the CREATE.SLOT function which is explained farther below.

In any case, at this point the local variable slot contains the value of a slot. In this case it is relation-69. The fifth step is to assign to the local variable value-facet the first out-arc of slot. In this case, as with all slots, which are binary relations, there is at most one out-arc. Its value is a concept which, in this case, is concept NUMBER:600. It is labelled 70 in FIG. 9 and is denoted as concept-70. Its referent's value is currently 600. The next to last step is to set its referent's value to the value bound to new-value, which, in this case, is 625. The last step is to return his new value, 625.

Figure 19:
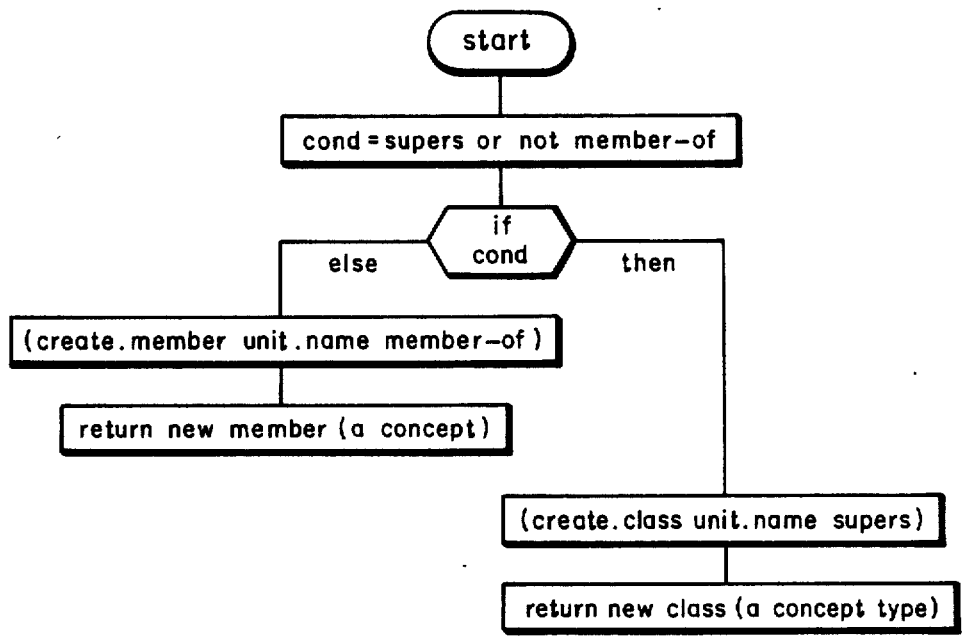

The next flowchart is for UNITCREATE and is shown in FIG. 19. The example used is for Sopwith-Camel. For this example, it is assumed that a unit had not previously been created for it. UNITCREATE is explained this way because it exercises more parts of the flowchart.

(UNITCREATE 'Sopwith-Camel 'PLANE)—>concept-68

In this call 'Sopwith-Camel is bound to unit.name and 'PLANE is bound to supers. The first step is to evaluate a boolean condition. The condition is that either a value has been specified for supers or, if it hasn't, one also has not been specified for "member-of". The value of this condition is assigned to local variable condition. The second step is to test it and call the appropriate class or member creation function. The value returned by the creation function called is returned.

Figure 20:
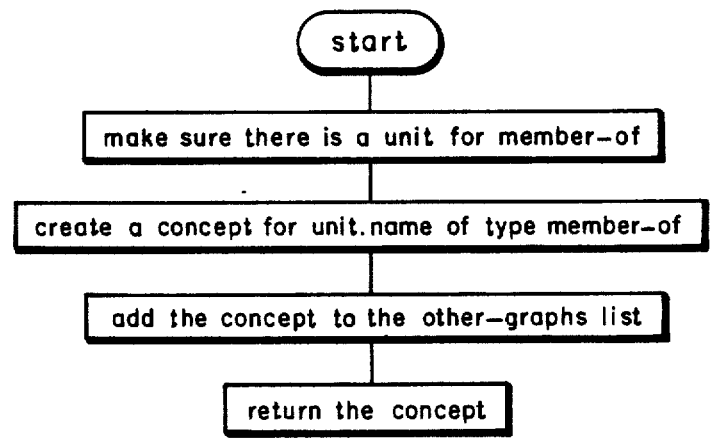

The next flowchart is for CREATE.MEMBER and is shown in FIG. 20. The example is taken from above which would execute the following:

(CREATE.MEMBER 'Sopwith-Camel 'PLANE-)—>concept-68

The first step is to make sure that a class unit exists for 'PLANE by executing CREATE.CLASS which is explained below. The second step is to create a concept corresponding to the member unit 'Sopwith-Camel of type 'PLANE. The result is concept PLANE: Sopwith-Camel which is labelled 68 in FIG. 9 and is denoted as concept-68. The last step is to add this concept to the list of other-graphs for the current canon because other-graphs contains all the members created for class units of this canon. Finally, the new unit, concept-68, is returned.

Figure 21:
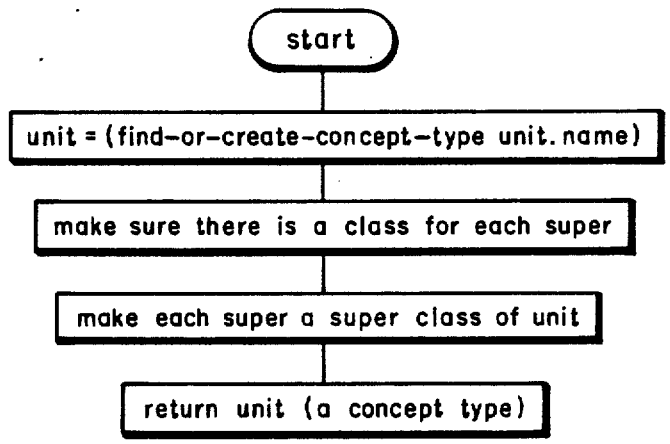

The next flowchart is for CREATE.CLASS and is shown in FIG. 21. The default for UNITCREATE is that if neither a super class nor a parent is specified, then the unit assumed to be a class. This is the case if PUT.-VALUES is called and the unit named had not previously existed.

The algorithm assumes that the unit may already exist. The first step is to assign to the local variable unit a concept-type. It is found by searching the type's for one that already exists or, if it didn't, creating a new type. The function FIND-OR-CREATE-CONCEPT-TYPE is assumed to exit as part of the underlying conceptual structures implementation. The second step is to be sure that a class unit exists for each class in supers. This is done by calling CREATE.CLASS recursively. The third step is to make the new class a subclass of each of the classes in supers. This is done using the functions of the underlying implementation of conceptual structures. The last step is to return the value of unit, a concept-type representing a class unit.

Figure 22:
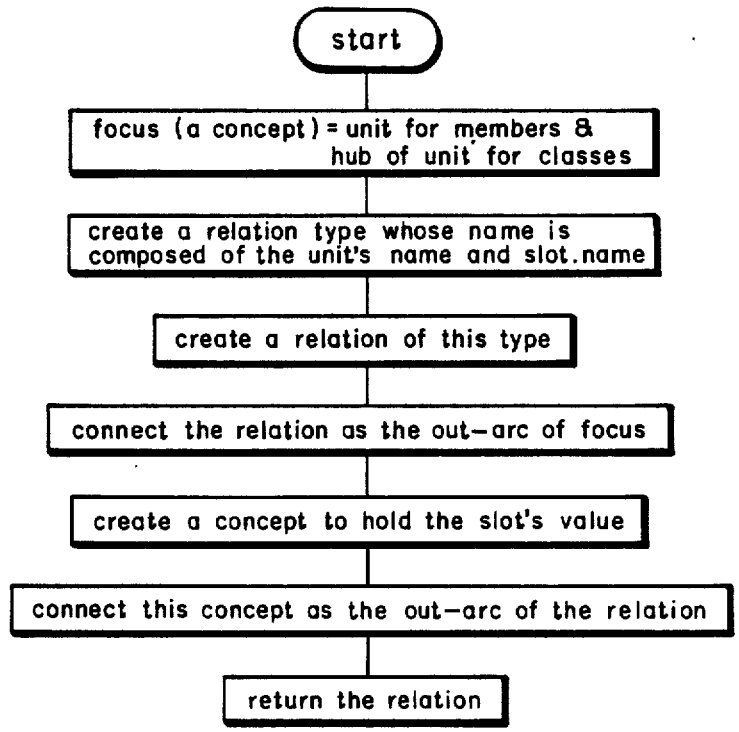

The last flowchart is for CREATE.SLOT and is shown in FIG. 22. A typical example would be if Sopwith-Camel did not already have a height slot. In that case, PUT.VALUES would execute the following:

(CREATE.SLOT concept-68 'height)—>relation-69

This call to CREATE.SLOT binds concept-68 to unit and 'height to slot.name. The first step is to assign a value to the local variable focus. The value, as before for focus, is the concept representing the unit for member units and for class units the hub of the lambda abstraction definition graph. For concept-68 the hub is itself, concept-68. The second step is to create a type definition for the height slot of the unit. The name of the type, to assure uniqueness of slots within each unit, is composed of the names of the unit and slot. In this case the composed name is sopwith-camel . . . height. The third step is to create a relation of this type to represent the slot. In this case it would be relation-69.

The fourth step is to connect the relation created, relation-69, as the out-arc of the focus, concept-68, as shown in FIG. 9. The fifth step is to create a concept to hold the slot's value and the sixth step is to connect it as the out-arc of the relation. In this case create concept-70 (without any type or value) and connect it as the out-arc of relation-69 as shown in FIG. 9. The last step is to return the relation representing the slot, relation-69.

A performance optimization is to improve the search for a unit given its name. Currently, this is very inefficient for member units because a list of all member units (the other-graphs list) must be searched sequentially. A simple extension is to make the name of each unit into a global variable (intern it in LISP) and assign its value as the unit. This puts the burden of searching for a unit on the LISP read table. One could also create a separate hash table for unit names.

Figure 23:
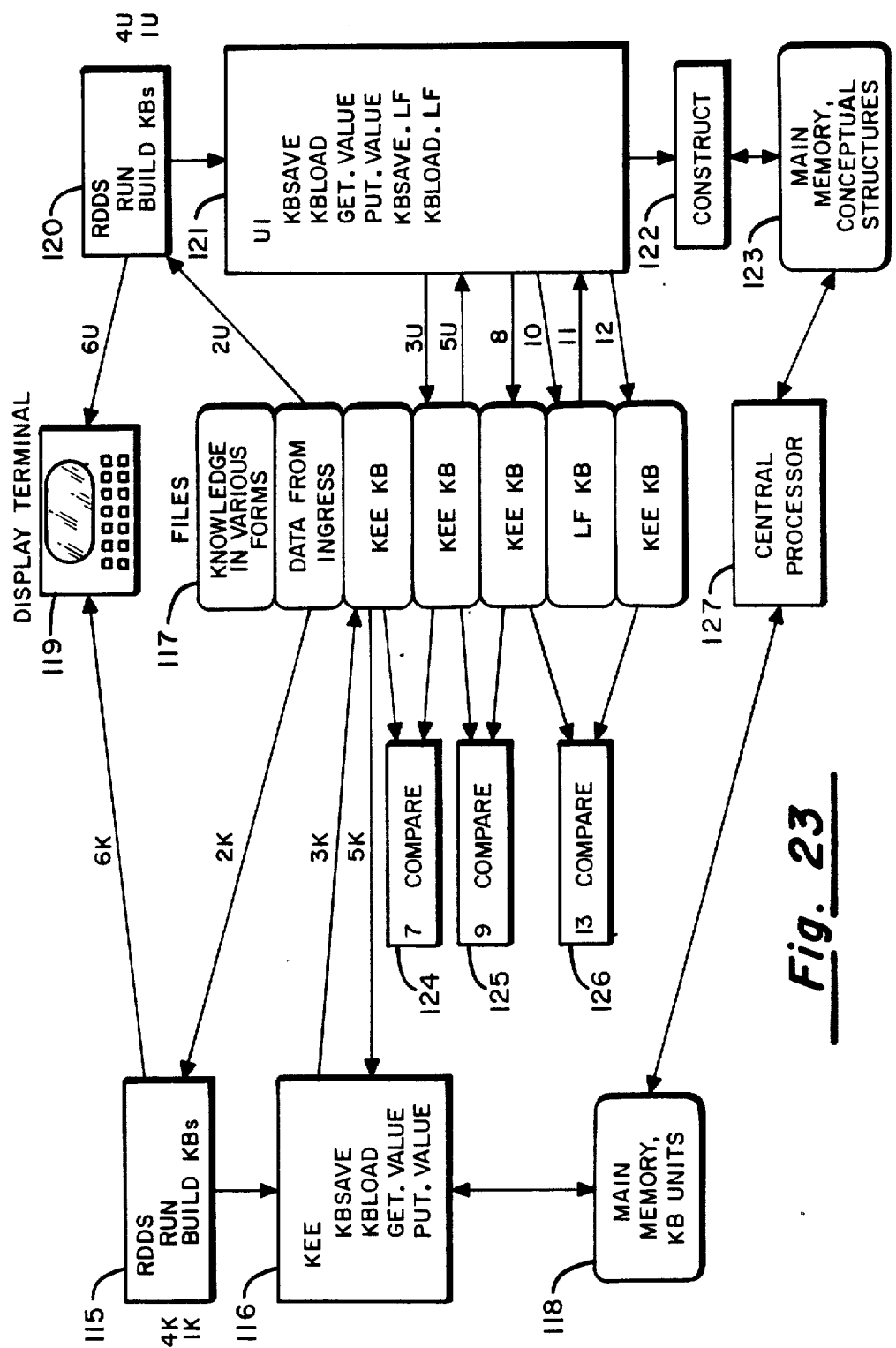
FIG. 23 is a schematic diagram of a system employing the present invention.

A system employing the present invention is illustrated in FIG. 23 which is a general purpose data processing system employing central processor 127, main memory units 118 and 123, display terminal 119 and files 117 which may be kept in a long term storage device such as a disk drive and the like. The remaining boxes of FIG. 3, to be described below, represent different knowledge bases which are employed in the present invention. The user interface is by way of terminal 119.

In FIG. 23 the particular software which is an example of the present invention is called Rapid Design and Development System (RDDS) which runs on top of the KEE software 116. The initialization step 1k builds knowledge bases employing data 2K from the INGRESS Database Management System which may be obtained from Relational Technology, Inc. and is stored in files 117. The knowledge bases thus far are represented internally by KEE in the computer's memory 118. The next step 3k is to store the knowledge bases back in file system in the KEE format.

Display terminal 119 is used to run RDDS as an application program. Step 4k of RDDS 115 is the execution of the application program. It loads the knowledge bases 5k back into main memory 118 each time the application is run. The information presented on display terminal 119 is indicated as step 6k.

RDDS software 120 runs on top of the Unit Interface (UI) software 121 which uses software that implements the conceptual structures. To this end, CONSTRUCT (CONceptual STRUCtures editing Tool) 122 is employed. UI 121 calls routines in CONSTRUCT to create conceptual structures for each KEE unit. These are created by CONSTRUCT in the computers main memory 123. Either the KEE or UI and CONSTRUCT, but not both are loaded into the computer for use by RDDS. When UI and CONSTRUCT are loaded, steps 1u through 6u are the same as for the steps employed for running RDDS on top of KEE.

Step 124 represents the process of comparing the knowledge bases in the KEE format as built by KEE with the same knowledge bases in the KEE format built by UI. Step 125 represents the loading of UI knowledge bases and saving them in a linear format (LF), loading the LF form back into memory, saving that back in the KEE format and comparing the original with the final result to verify that no information is lost when knowledge bases are stored in a LF format.

EPILOGUE

A system and method have been described above for storing frame/unit date in conceptual structures and also provides algorithms for accessing that data in conceptual structures as if it were a frame/unit or collection of them. The present invention improves access to the knowledge and data stored in conceptual structures by allowing symbolic access to that knowledge and data.

While but one embodiment of the present invention has been described, it will be apparent to those skilled in the art that variations and modifications may be made therein without departing from the spirit and scope of the invention as claimed.

What is claimed is:

1. A method of operating a data processing system having memory means and processor means coupled to said memory means comprising, storing concept data, relation data, calculation function code bits, knowledge representation function code bits and symbolic access code bits in said memory means, utilizing said processor means to access symbolic access code bits in order to acquire knowledge representation frame code bits that are related to said accessed symbolic access code bits, wherein said knowledge representation frame code bits represent storage addresses of said memory means for related concept data, relation data and calculation function code bits, and employing said processor means so that said processor means utilizes said acquired knowledge representation frame code bits to obtain said related concept data, relation data and calculation function code bits from said memory means.

2. A method as claimed in claim 1 wherein said data processing system comprises viewing means comprising the further step of utilizing said processor means to link said concept data and said relation data into conceptual graphs that are viewable on said viewing means.

3. A method as claimed in claim 1 wherein said data processing system comprises viewing means comprising the further step of utilizing said processor means to link concept data and calculation function code bits into data flow graphs that are viewable on said viewing means.

4. A method as claimed in claim 1 wherein said data processing system further comprises a viewing means and includes the further step of utilizing said processor means to link said concept data, relation data and calculation function code bits into bound data flow graphs that are viewable on said viewing means.

5. A method as claimed in claim 1 wherein said data processing system comprises viewing means comprising the further step of utilizing said processor means to link concept data, relation data and calculation function code bits into a type lattice that is viewable on said viewing means.

* * * * *